US006222912B1

(12) United States Patent
Breuer

(10) Patent No.: US 6,222,912 B1
(45) Date of Patent: Apr. 24, 2001

(54) METHOD AND SYSTEM FOR BILLING TOLL-FREE CALLS FROM PUBLIC TELEPHONES

(75) Inventor: Philip Joseph Breuer, Shreveport, LA (US)

(73) Assignee: Praeses Corp., Shreveport, LA (US)

( * ) Notice: Subject to any disclaimer, the term of this patent is extended or adjusted under 35 U.S.C. 154(b) by 0 days.

(21) Appl. No.: 09/252,268

(22) Filed: Feb. 18, 1999

Related U.S. Application Data

(60) Provisional application No. 60/094,017, filed on Jul. 24, 1998.

(51) Int. Cl.[7] .................................................. H04M 15/00
(52) U.S. Cl. .......................... 379/114; 379/115; 379/123; 379/112
(58) Field of Search .................................... 379/112, 113, 379/114, 115, 119, 121, 220, 207, 123

(56) References Cited

U.S. PATENT DOCUMENTS

| 4,525,601 | | 6/1985 | Barnich et al. . | |
|---|---|---|---|---|
| 4,788,719 | | 11/1988 | Gupta . | |
| 5,425,090 | * | 6/1995 | Orriss | 379/201 |
| 5,511,113 | * | 4/1996 | Tasaki et al. | 379/112 |
| 5,557,664 | | 9/1996 | Burns et al. . | |
| 5,699,416 | | 12/1997 | Atkins . | |
| 5,742,667 | * | 4/1998 | Smith | 379/114 |
| 5,793,851 | * | 8/1998 | Albertson | 379/114 |
| 5,850,432 | * | 12/1998 | Desai et al. | 379/115 |
| 5,875,237 | * | 2/1999 | Bolinger, Jr. et al. | 379/114 |
| 5,978,811 | * | 11/1999 | Smiley | 707/103 |
| 5,991,377 | * | 11/1999 | Malik | 379/114 |
| 6,011,837 | * | 1/2000 | Malik | 379/112 |
| 6,023,504 | * | 2/2000 | Connolly | 379/220 |
| 6,058,177 | * | 5/2000 | Newcombe et al. | 379/210 |

* cited by examiner

Primary Examiner—Curtis Kuntz
Assistant Examiner—Quoc Tran
(74) Attorney, Agent, or Firm—Morris, Manning & Martin, LLP; Jon M. Jurgovan

(57) ABSTRACT

A system and method for storing Responsible Organization data corresponding to toll free telephone calls provides Payphone Service Providers (PSPs) with the data for billing or auditing Per Call Compensation (PCC) charges and payment. The method includes the steps of generating a query for Resp Org data corresponding to the toll-free telephone number for a call received at a Service Switching Point (SSP), sending the generated query from the SSP to a Service Control Point (SCP), extracting Resp Org identification data from the response to the generated Resp Org query, and incorporating the Resp Org identification data into a call detail record (CDR). Preferably, the Resp Org query is included in the query for call routing data but it may be a separate query. Additionally, the Resp Org identification data is preferably included in the CDR for the received call but it may be incorporated in a separate record. The system and method utilize data within the SCP that identifies the Resp Org at the time the call is processed. This data has not previously been utilized despite the need for PSPs to know the identity of Resp Orgs. Instead, SSPs have heretofore queried SCPs only for call routing information and Resp Org identification has not been previously utilized by a telecommunication switch.

15 Claims, 2 Drawing Sheets

US 6,222,912 B1

METHOD AND SYSTEM FOR BILLING TOLL-FREE CALLS FROM PUBLIC TELEPHONES

This application claims the benefit of Provisional No. 06/094,017 filed Jul. 24, 1998.

FIELD OF THE INVENTION

This invention relates to transport, measurement and billing systems for telecommunications charges, and more particularly, for transport, measurement and billing systems for Payphone Service Providers (PSPs).

BACKGROUND OF THE INVENTION

In a local exchange area, a carrier has subscribers for various classes of services for one or more telephone numbers. These telephone numbers correlate to accounts with the local exchange carrier (LEC) to which the LEC bills the subscription services. Also installed within the LEC area are public pay phones or stations that are owned by PSPs. Service to these telephones is provided on a per call basis with the charges being paid by the user of the telephone.

When a direct dialed call placed from a telephone located within an LEC service area is made to a destination number that is outside the LEC service area, the call is routed through one or more carriers to the destination number. For example, a long distance telephone call requires the call to be transferred from the LEC to a long distance carrier which may transfer the call to one or more intervening long distance carriers before it is transferred to the LEC servicing the destination number. At each transfer, the carrier providing the telephone call does so in accordance with the terms of a contractual arrangement with the carrier to which the call is being transferred. The charges for transporting the call to the next carrier are accumulated and billed by each carrier to the next long distance carrier and eventually to the long distance carrier selected by the subscriber of the originating number. The originating number is passed from the LEC servicing the originating number to the first long distance carrier transporting the call at the time of the transfer of the call. Typically, the long distance carrier verifies the existence of an account corresponding to the originating number by querying a customer account database for the long distance carrier. The customer account database for a carrier is typically a proprietary database maintained by the carrier.

The transfer and billing arrangements for toll-free calls differ in some respects from that presented above. Toll-free calls are calls placed to telephone numbers currently having an area code of 800, 888 or 877. The Industry Numbering Committee (INC) has reserved the remaining 8XX (822, 833 . . . 866) codes for future toll-free service. One difference arises from the fact that toll-free calls are billed to the destination number—not the originating number. Another difference of toll-free calls is that toll-free numbers are "virtual" numbers. That is, the toll-free number actually maps to a destination number within some LEC service area. When a user enters a destination number that is a toll-free number, the call is delivered to a Service Switching Point (SSP) switch. An SSP is a telecommunications switch that is enabled by software to utilize the features and protocol of Signaling System 7 (SS7) to process calls delivered to it.

SS7 is an out-of-band signaling system that separates call transport from its routing. SS7 uses database queries to establish and maintain call routing information and special features. Signaling Transfer Points (STPs) are routing components in the SS7 network that support this out-of-band capability and route messages between different components in the network, such as SSPs and Service Control Points (SCPs). SCPs are computers within an SS7 network that provide telephone switches with call routing and other special processing instruction data. When a toll-free call is delivered to the SSP, the actual number to which the call will be routed is unknown to the SSP. The calls are processed with the responses from databases queried by the SSP to gather routing information and/or transport carrier identification data. To determine how to route the toll-free call, the SSP switch queries an SCP. The SCP responds with call routing data that identifies the transport carrier to which the call is to be transferred and the call is transferred by the SSP to the identified carrier's Point of Presence (POP) for that LEC.

The SSP at the long distance carrier which receives the toll-free call then queries an SCP which provides routing data needed to transport the call. This routing data may dictate transport to another carrier and may identify the destination number that corresponds to the toll-free number. The call is then routed as described above with the service charges for each carrier being accumulated and eventually billed to the responsible organization (Resp Org) for the destination number.

In this scenario, the LEC servicing the area from which the toll-free call originated obtains identification of the carrier; but, does not necessarily obtain data specifically identifying the Resp Org.

In the process just described, the LEC has received data from the SCP identifying the toll-free number as dialed and the transport carrier to which the call is to be transferred. The carrier identified by the routing data may or may not be the Resp Org corresponding to the toll-free number. The SSP in the LEC service area in which the call originated, stores the dialed number and the initial carrier as part of a call detail record (CDR).

The SCPs receive the data for routing toll-free calls from a Service Management System 800 (SMS/800) which is an operations and administrative support system used for the generation and maintenance of toll-free routing information, known as customer records (CRs). Responsible Organizations (Resp Orgs) load new CRs and changes to existing CRs into the SMS/800. Resp Orgs are the businesses, typically telecommunication carriers, that are chosen by toll-free number customers (purchasers) to be responsible for maintaining their CRs in SMS/800. Periodically (currently at fifteen minute intervals), the SMS/800 database downloads CRs and CR changes into the databases of the SCPs. Various telecommunications carriers operating within the United States maintain mated pairs of SCPs, one as a primary and the other as a back-up. There are approximately twenty (20) such mated pairs of SCPs in the U.S. and Canada.

In 1996, the Federal Telecommunications Act (FTA) was passed. This act directed that PSPs are to receive compensation, Per Call Compensation (PCC), for toll-free calls originating from public pay telephones installed and operated by the PSP. Some of the largest PSPs are the pay phone provider businesses of the LECs (US West Public Access and Smart Card Division, Ameritech Pay Phone Services, etc.) This PCC charge is different than those passed along to the carrier to which the call is transferred because it is not a LEC charge, but a PSP charge. Consequently, it is not covered by the terms of the contract between the LEC and the carrier. Thus, PSPs now need to know the identity of the Resp Org so the PCC may be billed to the Resp Org that administers the toll-free number in the SMS/800 database. Likewise, this data may be used to audit the reported toll-free call count for a Resp Org. However, previously known transfer, CDR, call accounting, and billing systems for toll-free calls do not provide the identity of the Resp Org because the LEC and other carrier (network) SSP switches only obtained the routing information required for a toll-free call. Prior to the enactment of FTA, LECs processed toll-free calls placed from public pay telephones without determining the entity responsible for maintaining the toll-free number. Furthermore, the PSPs need to gather this information from a source that:

1. Is situated in the network such that it can detect the call; and
2. Is independent of the organization financially responsible to the PSP for PCC.

According to the FCC orders supporting execution of the FTA, each carrier is to pay PCC to the appropriate PSP within 110 days of each calendar quarter for calls occurring in that period. However, the Resp Org for a given toll-free number may change during that period. In order to accurately bill or audit PCC, a Resp Org responsible for a toll-free number at the time a call was placed must be correctly identified. Because the Resp Org identity for a toll-free number may change within the period that PCC accumulates for a toll-free number, the content of the SMS/800 database may also change within that period and PSPs are consequently not able to accurately determine, after the fact, the Resp Org responsible for a toll-free number at a particular time by querying SMS/800.

What is needed is a system that accurately identifies Resp Orgs responsible for toll-free calls, with date and time detail, so a PSP may bill and may audit the Resp Org for PCC on toll-free calls originated from public telephones.

SUMMARY OF THE INVENTION

The above limitations of previously known systems have been overcome by a system and method made in accordance with the principles of the present invention. The method of the present invention includes the steps of generating a query for Resp Org data corresponding to the toll-free telephone number for a call received at an SSP, sending the generated query from the SSP to an SCP, extracting Resp Org identification data from the response to the generated Resp Org query, and incorporating the Resp Org identification data into a call detail record. Preferably, the Resp Org query is included in the query for call routing data but it may be a separate query. Additionally, the Resp Org identification data is preferably included in the CDR for the received call but it may be incorporated in a separate record. The method of the present invention utilizes data within the SCP that identifies the Resp Org at the time the call is processed. This data has not previously been utilized despite the need for PSPs to know the identity of Resp Orgs. Instead, SSPs have heretofore queried SCPs only for call routing information and Resp Org identification has not been previously utilized by a telecommunication switch.

The method of the present invention may also be implemented in a telecommunication switch, such as an SSP, by a query generator that extracts a toll-free telephone number from an incoming toll-free call from a public pay telephone and generates a query for the Resp Org corresponding to the extracted telephone number, and a call detail record generator that incorporates Resp Org data from the response to the Resp Org query to generate a call detail record. Using the call detail records generated by this system, PCC may be billed to the Resp Org that was identified as responsible for the telephone number at the time of the call.

In an alternative embodiment of the present invention, a Resp Org/toll-free database is used to accumulate records that identify toll-free numbers, the Resp Org associated with the number, and the effective date and time that the relationship between the number and Resp Org was established. This database includes at least one record for each toll-free number within the SMS/800 database discussed above. Each record includes Resp Org identification data and time data that defines the time the relationship between the toll-free number and the Resp Org was established. As the SMS/800 database is updated, any change in the Resp Org for a toll-free number (or establishment of a new toll-free number) is used to generate a record in the Resp Org/toll-free database for the toll-free number, the new Resp Org and its relationship start time. The relationship start time is defined as the time that the new information is provided to the SCPs. This Resp Org/toll-free database may then be queried to correlate the time for a toll-free call to a time of ownership for that toll-free number and the corresponding Resp Org. This embodiment has the advantage of not requiring modification to the Intelligent Network (IN) software in the SSPs.

These and other advantages and benefits of the present invention may be ascertained from the detailed description of the invention presented below and the drawings discussed therein.

BRIEF DESCRIPTION OF THE DRAWINGS

The accompanying drawings, which are incorporated and constitute a part of the specification, illustrate preferred and alternative embodiments of the present invention and, together with a general description given above and the detailed description of the embodiments given below, serve to explain the principles of the present invention.

DETAILED DESCRIPTION OF THE INVENTION

Figure 1:
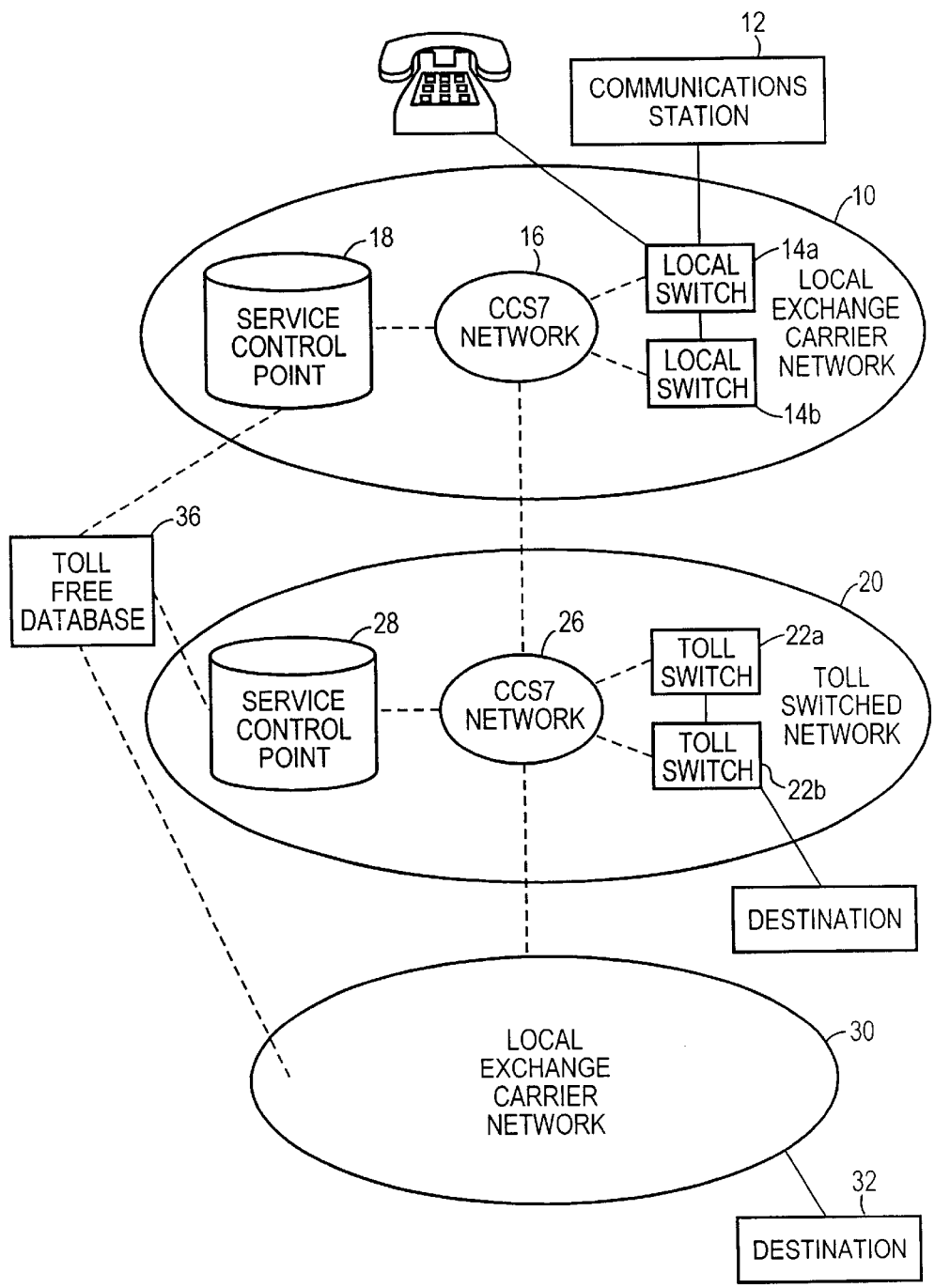
FIG. 1 is a block diagram of a system in which the present invention operates.

FIG. 1 is a block diagram depicting an originating LEC network 10, a toll switch network 20, such as a long distance carrier, and a destination local exchange area network 30. Coupled to originating LEC network 10 is a plurality of telephones including a public pay telephone 12. Within LEC network 10 are local switches 14a and 14b, a CCS7 common channel signaling network 16, and an SCP 18. Local switches 14a and 14b are used to couple telephone calls between source and destination numbers within LEC network 10 and to transfer telephone calls from LEC network 10 to the toll switch network 20. Local switches 14a and 14b operate under the control of CCS7 network 16.

CCS7 network 16 is also coupled to SCP 18. In response to receiving a toll-free call, local switch 14a or 14b generates a call routing query that is sent via CCS7 network 16 to SCP 18. SCP 18 responds with call routing data that is used to transport the call. SCP 18 contains call routing data and Resp Org data for toll-free telephone numbers that SCP 18 periodically receives from toll-free number database 36.

In a similar manner, toll switch network 20 contains toll switches 22a and 22b, CCS7 network 26, and an SCP 28. SCP 28 also contains call routing information and Resp Org data that it receives periodically from toll-free number database 36. A toll switch network having a structure similar to that shown for network 20 is provided for each carrier having a point of presence within LEC network 10. Destination LEC network 30 has a structure similar to originating LEC network 10.

Local switches 14a and 14b operate under the control of CCS7 network 16 to direct calls within LEC network 10. For toll-free calls originating within LEC network 10, local switch 14a generates a call routing data query that is provided by CCS7 network 16 to SCP 18. SCP 18 responds with call routing data that identifies the carrier to which the call is to be routed. For toll-free telephone calls that originate and terminate at numbers serviced by LEC network 10, and for which that LEC is the Resp Org, local switch 14a routes a call from the originating number to the destination number, after the routing query is sent to the SCP. Local switch 14a may be comprised of a plurality of switches and is shown as a single switch in the drawing for illustrative purposes only. When the call requires handling by another carrier, local switch 14a uses the carrier data from SCP 18 to route the call to toll switch 22a, which may also include routing through toll switch 14b. Toll switch 22a operates under the control of CCS7 network 26. In response to receiving a toll-free call from LEC network 10, toll switch 22a generates a call routing data query which is provided by CCS7 network 26 to SCP 28 for call routing information. This information may identify LEC network 10, LEC network 30 or another toll network for further routing. Eventually, the call is transported to a destination LEC network 30 which routes the call to destination number 32.

In the system and method of the present invention, local switches 14a and 14b are provided with computer software that generates a database query for Resp Org data. Preferably, this Resp Org query is included in the query for call routing data although it may be generated as a separate query. The Resp Org query is received by CCS7 network 16 and delivered to SCP 18. Because the database downloads from SMS/800 database 36 contain Resp Org data, SCP 18 provides the Resp Org data in a response to one of the local switches. The software in local switch 14a extracts the identity of the Resp Org from the response to the Resp Org query and generates a call detail record for the toll-free call that includes data identifying the Resp Org. Preferably, the Resp Org identifying data is stored in the CDR for the call although it may be used to generate a separate call detail record for the PCC. The call detail records may then be provided to PSPs to bill and/or audit the Resp Orgs responsible for managing a toll-free number.

Local switches 14a, 14b, 22a and 22b are well-known telecommunications switches. Any telecommunication switch that is capable of communication with a SS7 system, such as an SSP switch, may be modified to include the Resp Org query generating and response extracting software to implement the system and method of the present invention. An example of such a switch is the 5ESS-2000 switch available from Lucent Technologies.

CCS7 network 16 and 26 are also well known. Examples of this type of network are designated SS7 Network, Intelligent Network or Advanced Intelligent Network and are available from GTE Intelligent Network and AT&T. Specifications for SS7 are described in American National Standard Institute (ANSI) sections T1.11x. These ANSI standards are based on the 1984 Red Book specification of Signaling System No. 7 (SS#7) for international use issued by the CCITT Study Group XI.

Toll-free database 36 is preferably a publicly available database called the SMS/800. The SMS/800 Management Team (SMT) is responsible for overall management of the SMS/800. The SMS/800 database currently updates roughly 20 mated pairs of SCPs in the US and Canada with toll-free routing information every 15 minutes. The query commands for this database are defined in the Transaction Capabilities Application Part (TCAP) of SS7. Additional information can be found in ANSI T1.114. In response to a query, data as specified in the TCAP is received by the switch that sent the query. The identity and billing address of the Resp Org data retrieved from an SCP may be translated at a later date by joining this information to the list of Resp Orgs maintained by the SMT. The software that implements the method discussed in more detail below is preferably implemented in accordance with the ANSI specifications of SS7 to maintain compatibility with the controllers and computers used in switches 14a, 14b, 22a and 22b.

Figures 2, 3:
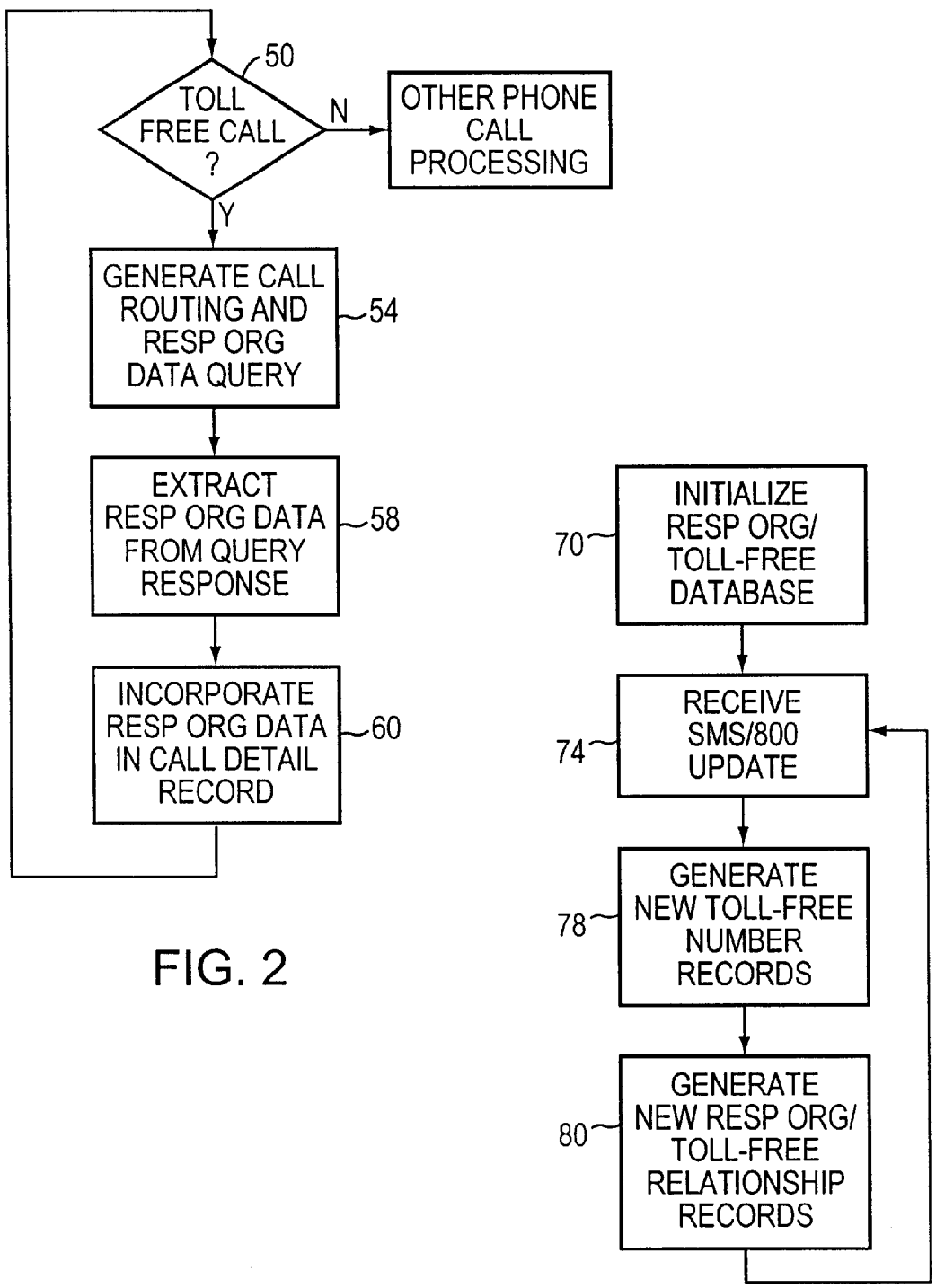
FIG. 2 is a flow chart of an exemplary method implemented with the system of FIG. 1.
FIG. 3 is a flow chart of an exemplary method for providing a Resp Org/toll-free database.

An exemplary method implemented by the software installed in a local switch or toll switch is shown in FIG. 2. When an SS7 enabled switch (SSP) detects that a toll-free number has been dialed (Block 50), the switch software generates a query for call routing data and a Resp Org query for Resp Org data (Block 54). These queries are transported through the SS7 network to an SCP. The SCP retrieves the call routing data and Resp Org data from its database maintained with periodic downloads from the SMS/800 database. The retrieved data are routed back to the SSP which uses the routing information to conduct typical toll-free call processing. By known methods, this call routing information is added to the call detail record as part of the automatic message accounting (AMA) record. The switch of the present invention also extracts the Resp Org identifying data from the query response (Block 58) and stores the data for later access. Preferably, the data are added to the call detail record (Block 60). Once this Resp Org information for a toll-free call has been stored, the PSP, or any other entity working on its behalf, may obtain the data for toll-free calls originating at its pay phones to generate bills or audit payments from the appropriate Resp Org for PCC. If the data are incorporated in call detail records then these records are obtained by the PSP or entity working on its behalf to generate bills or audit payments.

An exemplary method for implementing an alternative embodiment of the present invention is shown in FIG. 3. This embodiment does not require modification of the SS7 enabled telecommunication switches but rather enhances the functionality of SMS/800 database 36 with a system that maintains a Resp Org/toll-free database. Each Resp Org provides the call routing and other network information for each toll-free number it manages to the SMS/800 toll-free database as is known. Thus, the SMS/800 database contains toll-free call routing data and as described above, this data is currently broadcast approximately every 15 minutes to SCPs in the United States and Canada. Each update defines the Resp Org/toll-free number relationship for fiscal responsibility relative to PCC and general toll-free call routing until the next update. Consequently, the information stored within the SCPs remains accurate until a Resp Org changes the data corresponding to one of the numbers for which it is responsible and the update information is provided to the SMS/800 database. The alternative method of the present invention uses the SMS/800 SCP updates to maintain a Resp Org/toll-free database. The Resp Org/toll-free database initially contains the Resp Org/toll-free number relationship and the initial date and time for that relationship at the time the Resp Org/toll-free database is first populated with data from an SMS/800 broadcast update (Block 70). At each periodic SCP update (Block 74), data corresponding to new toll-free numbers are used to generate records for the new toll-free number, its Resp Org, and the effective date-time for the association (Block 78). Likewise, the Resp Org/toll-free database records are compared to the update data and for each Resp Org/toll-free number relationship that has changed, a record is generated and stored in the database for the new relationship along with the effective date and time the relationship was established at the SCPs (Block 80). The effective schema includes the data noted in the following table:

| Toll Free Number | Resp Org | Effective Date-Time | |
|---|---|---|---|
| 8002655328 | MCI | 1/1/1996 | 1000.536 |
| 8002655328 | ATT | 1/1/1997 | 0200.536 |
| 8002655328 | HMG | 1/27/1998 | 1207.555 |
| 8002651122 | ATT | 1/1/1996 | 1000.536 |

A record for a given toll-free number is not inserted every time routing or other information regarding that toll-free number is updated so long as the Resp Org managing that toll-free number remains the same. However, each time the SMS/800 update indicates a different Resp Org is not managing that toll-free number, a record or row is inserted indicating the toll-free number, the Resp Org, and the effective date-time of the update. This format allows the Resp Org to be determined for any valid toll-free number and time of call combination.

The Resp Org/toll-free database of the alternative embodiment may be integrated with known telecommunication network architecture in several ways or any combination of each. For one, the Resp Org/toll-free database may be maintained separately, but connected to SMS/800 to allow updates with number, Resp Org, and date-time information as identified in the table above at each SCP update, and this database may be queried by PSPs or billing entities for PSPs for Resp Org data to be used in generating PCC charges. For another, the Resp Org/toll-free database may be incorporated into the schema of the SMS/800 database so that database may be accessed by PSPs for billing purposes. In another arrangement, the Resp Org/toll-free database may be maintained separately from the SMS/800 database but coupled to the SS7 Intelligent Network so queries from PSPs, entities working on their behalf, and other interested parties with approved entry may access the database using existing SS7 specifications, connections, and network architecture.

While the present invention has been illustrated by the description of the preferred and alternative embodiments and while the embodiments have been described in considerable detail, it is not the intention of the applicants to restrict or in any way limit the scope of the appended claims to such detail. Additional advantages and modifications will readily appear to those skilled in the art. The invention's broader aspects are therefore not limited to the specific details, represented apparatus and method, and illustrative examples shown and described. Accordingly, departures may be made from such details without departing from the spirit or scope of applicant's general inventive concepts.

What is claimed is:

1. A method for identifying a responsible organization (Resp Org) for a toll-free telephone call, the Resp Org defined as an entity designated to manage a customer's Toll-Free service record (CR) in a Service Management System/800 (SMS/800), the method comprising the steps of:

generating a query for Resp Org data corresponding to a toll-free telephone number received by a Service Switching Point (SSP) switch;

sending the generated query to a Service Control Point (SCP);

extracting Resp Org identification data from a response to the query, the response sent by the SCP; and storing the extracted Resp Org identification data so the Resp Org for the telephone number at the time of the call is available for billing or auditing.

2. The method of claim 1 wherein said storing step stores the Resp Org data in association with call data.

3. The method of claim 1 further comprising the step of: including the generated query in a call routing data query.

4. The method of claim 2 further comprising the step of: including the generated query in a call routing data query.

5. The method of claim 2, the storing step being comprised of the steps of:

incorporating the extracted Resp Org identification data and call data into a Call Detail Record (CDR); and sending the CDR to a Payphone Service Provider (PSP).

6. The method of claim 5, further comprising the step of:

collecting a plurality of CDRs at a PSP for each Resp Org so that a PSP can bill each Resp Org for PCC charges or audit PCC payment from the Resp Org for toll free calls corresponding to at least one toll-free number associated with the Resp Org at the SCP.

7. A method for identifying a responsible organization (Resp Org) for payment of Per Call Compensation (PCC) charges for a toll-free telephone call, the Resp Org defined as an entity designated to manage a customers Toll-Free service record (CR) in a Service Management System/800 (SMS/800), the method comprising the steps of:

initially populating data records in a responsible organization/toll-free database with responsible organization/toll-free number relationship data from a SMS/800 broadcast update and initial date/time data corresponding to the relationship data;

generating new data records in the responsible organization/toll-free database in response to a new Resp Org being identified in the broadcast update for a toll-free number in one of the data records in the database, the new data records including date/time data corresponding to a Resp Org/toll-free relationship; and generating new data records for the responsible organization/toll-free database in response to a toll-free number being within the broadcast update that is not within one of the data records of the Resp Org/toll-free database.

8. The method of claim 7 further comprising the step of: identifying a Resp Org from the data record within the Resp Org/toll-free database that corresponds to a toll-free number and time of call combination.

9. The method of claim 7 further comprising the step of: processing queries from Payphone Service Providers to identify Resp Orgs for toll-free number and time of call combinations.

10. The method of claim 7 further comprising the step of: incorporating the generated data records in a Service Management System/800 (SMS/800) database.

11. The method of claim 9 further comprising the step of: sending the queries in a Signaling System 7 network.

12. A system for tracking toll-free calls within a telephone network, the system comprising:

a switch for receiving and identifying a toll-free call, the switch generating a query for responsible organization (Resp Org) data in response to receipt and identification of a toll-free call, the Resp Org defined as an entity designated to manage a customer's Toll-Free service record (CR) in a Service Management System/800 (SMS/800); and a database including toll-free number/Resp Org relationship data, the database responding to the query generated by the switch by sending Resp Org data corresponding to the toll-free number in the generated query.

13. The system of claim 12 wherein the switch incorporates the Resp Org data in a call detail record (CDR).

14. The system of claim 12 wherein the database is included in a Service Management System/800 (SMS/800) database.

15. The system of claim 12 wherein the database is a Resp Org/toll-free relationship database in a Service Control Point.

* * * * *